US008948488B2

(12) United States Patent
Can et al.

(10) Patent No.: US 8,948,488 B2
(45) Date of Patent: Feb. 3, 2015

(54) METHODS AND SYSTEMS FOR DIGITALLY ENHANCING AN IMAGE OF A STAINED MATERIAL

(75) Inventors: Ali Can, Troy, NY (US); Cemal Cagatay Bilgin, Troy, NY (US); Jens Rittscher, Ballston Lake, NY (US); Robert John Filkins, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 1051 days.

(21) Appl. No.: 12/533,406

(22) Filed: Jul. 31, 2009

(65) Prior Publication Data

US 2011/0026803 A1   Feb. 3, 2011

(51) Int. Cl.
*G06K 9/00* (2006.01)
*G06T 5/00* (2006.01)

(52) U.S. Cl.
CPC ....... *G06T 5/004* (2013.01); *G06T 2207/10024* (2013.01); *G06T 2207/30024* (2013.01)
USPC ............... 382/133; 348/43; 256/36; 382/100; 382/128; 382/132; 382/274

(58) Field of Classification Search
None
See application file for complete search history.

(56) References Cited

U.S. PATENT DOCUMENTS

| 5,805,721 | A | * | 9/1998 | Vuylsteke et al. | ............ | 382/128 |
| 6,160,618 | A | * | 12/2000 | Garner | .......................... | 356/318 |
| 6,463,181 | B2 | * | 10/2002 | Duarte | .......................... | 382/254 |
| 6,661,873 | B2 | * | 12/2003 | Jabri et al. | ................. | 378/98.11 |
| 6,690,466 | B2 | * | 2/2004 | Miller et al. | ................... | 356/326 |
| 7,139,416 | B2 | * | 11/2006 | Vuylsteke | ...................... | 382/128 |
| 7,245,751 | B2 | * | 7/2007 | Vuylsteke | ...................... | 382/128 |
| 7,321,674 | B2 | * | 1/2008 | Vuylsteke | ...................... | 382/128 |
| 7,362,915 | B2 | * | 4/2008 | Vuylsteke | ...................... | 382/274 |
| 7,489,799 | B2 | * | 2/2009 | Nilsen et al. | ................... | 382/100 |
| 8,160,331 | B2 | * | 4/2012 | Otsuka | .......................... | 382/128 |
| 2003/0161548 | A1 | * | 8/2003 | Vuylsteke | ...................... | 382/274 |
| 2005/0002458 | A1 | * | 1/2005 | Bruls et al. | ............... | 375/240.21 |
| 2005/0246354 | A1 | * | 11/2005 | Tamayo et al. | ............... | 707/100 |
| 2005/0277816 | A1 | * | 12/2005 | Maier et al. | ................... | 600/315 |
| 2006/0140465 | A1 | * | 6/2006 | Sato | ............................. | 382/128 |
| 2006/0253261 | A1 | * | 11/2006 | Maier et al. | ..................... | 702/19 |
| 2007/0003120 | A1 | * | 1/2007 | Pinset | .......................... | 382/129 |
| 2007/0009167 | A1 | * | 1/2007 | Dance et al. | ................... | 382/254 |
| 2007/0288174 | A1 | | 12/2007 | Young et al. | | |
| 2008/0074644 | A1 | * | 3/2008 | Levenson et al. | ............... | 356/36 |
| 2008/0074649 | A1 | * | 3/2008 | Levenson et al. | ............... | 356/73 |

(Continued)

OTHER PUBLICATIONS

Donoho et al. "When Does Non-Negative Matrix Factorization Give a Correct Decomposition into Parts", Stanfrd University, pp. 1-8.

(Continued)

*Primary Examiner* — Tsung-Yin Tsai
(74) *Attorney, Agent, or Firm* — Fletcher Yoder, P.C.

(57) ABSTRACT

Methods and systems for digitally enhancing an initial image of a material to which a plurality of stains were previously applied, that generally comprise: unmixing the image into a plurality of individual reconstructed images, each individual image corresponding to one of the stains; estimating a residual image corresponding to the difference between the original image and the reconstructed images; adjusting one or more components of the individual images; mixing the adjusted components using one or more estimated mixing coefficients; and adding the residual image to the mixed adjusted components to generate an enhanced image.

11 Claims, 15 Drawing Sheets

(56) References Cited

U.S. PATENT DOCUMENTS

| | | | |
|---|---|---|---|
| 2008/0152222 A1* | 6/2008 | Takeuchi | 382/167 |
| 2008/0294032 A1* | 11/2008 | Levenson et al. | 600/407 |
| 2009/0034871 A1* | 2/2009 | Keshet et al. | 382/274 |
| 2009/0219417 A1* | 9/2009 | Tsuruoka | 348/241 |
| 2009/0226059 A1* | 9/2009 | Levenson et al. | 382/128 |
| 2009/0245605 A1* | 10/2009 | Levenson et al. | 382/128 |
| 2009/0274351 A1* | 11/2009 | Otsuka | 382/128 |
| 2009/0324051 A1* | 12/2009 | Hoyt et al. | 382/133 |
| 2010/0027891 A1* | 2/2010 | Gwak et al. | 382/199 |
| 2010/0182461 A1* | 7/2010 | On | 348/241 |
| 2010/0329535 A1* | 12/2010 | Macenko et al. | 382/133 |
| 2011/0206254 A1* | 8/2011 | Patwardhan | 382/128 |
| 2011/0235881 A1* | 9/2011 | Lett et al. | 382/129 |
| 2012/0014583 A1* | 1/2012 | Sun | 382/132 |
| 2012/0293620 A1* | 11/2012 | Pahalawatta et al. | 348/43 |

OTHER PUBLICATIONS

Guillamet et al., "Introducing a Weighted Non-negative Matrix Factorization for Image Classification", Pattern Recognition Letters 24 (2003) 2447-2454.

Hoyer et al. "Non-negative Matrix Factorization with Sparseness Constraints", Journal of Machine Learning Research 5 (2004) 1457-1469.

Tang et al. "Non-negative Matrix Factorisation for Object Class Discovery and Image Auto-annotation", (2008), pp. 1-8.

Langville et al., "Initializaions for the Nonnegative Matrix Factorization", (2006), pp. 1-8.

Lee et al., "Learing the Parts of Objects by Nonnegative Matrix Factorization", pp. 1-10.

Lee et al., "Aklgorithms for Non-negative Matrix Factorizations", pp. 1-7.

Newberg et al., "A Framewrk for the Automated Analysis of Subcellular Patterns in Human Protein Atlas Images", Journal of Proteome Research, ( 2008), pp. 1-9.

Paatero et al., "Analysis of Different Modes of Factor Analysis as Least Squares Fit Problems", Chemometries and Intelligent Lab. Systems, 18 (1993) 183-194.

Park et al., "One-sided Non-Negative Matrix Factorization and Nonnegative Centroid Dimension Reduction for Text Classification", Georgia Inst. of Technology, pp. 1-7.

Rabinovich et al.,, Unsupervised Color Decomposition of Histologically Stained Tissue Samples, Univ. of California, pp. 1-7.

Shaw et al. "Imaging Green Fluorescent Protein Fusion Proteins in *Saccharomyces cerevisiae*", Brief Communication, pp. 701-704.

Zhang et al., "Image Fusion Based on Non-negative Matrix Factorization", IEEE (2004), pp. 973-976.

Nikolaus, Learning the Parts of Objects Using Non-negative Matrix Factorization (NMF), Feb. 12, 2007, pp. 1-22.

Park et al. "One-Sided Non-Negative Matrix Factorization and Non-Negative Centroid Dimension Reduction for Text Classification", Georgia Inst. of Tech., pp. 1-7.

Blondel et al., "Algorithms for Weighted Non-Negative Matrix Factorizatiion", pp. 1-13.

Depauw et al., "Assessment of Telomere Length in Hematopoietic Interphase Cells Using In Situ Hybridization and Digital Fluorescence Microscopy", Cytometry 32:163-169 (1998).

Search Report—Nov. 11, 2008.

* cited by examiner (a) Original Image (b) Reconstructed Image (c) Estimated Eosin (d) Estimated Hematoxylin (e) Red Channel (f) Green Channel (g) Blue Channel (a) Original Image (b) Reconstructed Image (c) Estimated Eosin (d) Estimated Hematoxylin (e) Red Channel (f) Green Channel (g) Blue Channel (a) Original Image (b) Reconstructed Image (c) Estimated Eosin (d) Estimated Hematoxylin (e) Red Channel (f) Green Channel (g) Blue Channel (a) Original Image (b) Reconstructed Image (c) Estimated Eosin (d) Estimated Hematoxylin (e) Red Channel (f) Green Channel (g) Blue Channel (a) Original Image (b) Reconstructed Image (c) Estimated Eosin (d) Estimated Hematoxylin (e) Red Channel (f) Green Channel (g) Blue Channel (a) $\gamma_e = 0.5, \gamma_h = 0.5$  (b) $\gamma_e = 0.5, \gamma_h = 1$  (c) $\gamma_e = 0.5, \gamma_h = 2$ (d) $\gamma_e = 1, \gamma_h = 0.5$  (e) $\gamma_e = 1, \gamma_h = 1$  (f) $\gamma_e = 1, \gamma_h = 2$ (g) $\gamma_e = 2, \gamma_h = 0.5$  (h) $\gamma_e = 2, \gamma_h = 1$  (i) $\gamma_e = 2, \gamma_h = 2$ (a) $\gamma_e = 0.5$, $\gamma_h = 0.5$   (b) $\gamma_e = 0.5$, $\gamma_h = 1$   (c) $\gamma_e = 0.5$, $\gamma_h = 2$ (d) $\gamma_e = 1$, $\gamma_h = 0.5$   (e) $\gamma_e = 1$, $\gamma_h = 1$   (f) $\gamma_e = 1$, $\gamma_h = 2$ (g) $\gamma_e = 2$, $\gamma_h = 0.5$   (h) $\gamma_e = 2$, $\gamma_h = 1$   (i) $\gamma_e = 2$, $\gamma_h = 2$

METHODS AND SYSTEMS FOR DIGITALLY ENHANCING AN IMAGE OF A STAINED MATERIAL

BACKGROUND

The invention relates generally to methods and systems for adjusting the contrast of individual dyes in color images of materials comprising a plurality or mixtures of dyes.

Color adjustment by manipulating the red, green, and blue components is a common tool used in digital image processing and analysis, including application in which biological images are digitized, processed and analyzed. For example, hematoxylin and eosin (H&E) staining is the most common staining method in histology, and has been used over a hundred years. The H&E has been favored due to its low cost, fast preparation, easy image acquisition, and the extensive knowledge and training behind it. Hematoxylin is a dye extracted by boiling the wood of logwood trees found mainly in South America and West India. The active dye in hematoxylin staining is hematein which is oxidized hematoxylin rather than the hematoxylin itself. Hematoxylin is usually mixed with metallic salts also called mordants, to enhance the blue color. Hematoxylin stains nucleic acids such as chromatin in the nuclei and ribosomes with blue-purple. The most common counterstain of hematoxylin is eosin. The most common type of eosin dye in the literature is eosin Y. Eosin stains the cytoplasm, collagen, muscle fibers, extracellular structures and red blood cells. An H&E stain may have some yellow, brown colors for the pigments in the tissue.

The color of the H&E varies across different labs, manufacturers, and preparation. Some pathologists prefer a darkly stained background where some prefer a clean background with clear and sharp nuclear staining. The most important factors that effect the H&E color during the preparation are the dye concentration, mordant ratio, pH, oxidation and time.

Given such variations in staining techniques and pathologists' preferences, it would appear to be advantageous to be able to digitally and selectively adjust the intensity of individual stains in a given image. However, separating individual stains in an image of a biological material that has been stained with a mixture of, or multiple, stains, and then manipulating the stain images has not previously been addressed in the literature or by competitors.

BRIEF DESCRIPTION

The methods and systems, of the invention generally referred to herein as a digital stainer, enable users, such as pathologists, to adjust the staining contrast, (e.g. for under or over-staining variations) for a variety of purposes. The methods and systems are also capable of adjusting color images in a dye domain, rather than simply a red, green, or blue color space. One or more of the embodiments, use a residual image to ensure an exact reproduction of the original image and an extended NMF to compute the individual H and E components, mixing coefficients and camera dark current.

The methods and systems are capable of adjusting the contrast of individual dyes in a color (red-green-blue) image comprising mixtures of, or multiple, dyes. Generally, one or more of the embodiments unmix the color image into individual dye components, then adjust each of the dye components, and subsequently mix the individual dyes to generate color images.

As noted, one nonlimiting use of these methods and systems is to digitally adjust the staining proportions of Hematoxylin and Eosin (H&E) stained tissue images. Such a use allows pathologists to digitally adjust the staining proportions of H&E images. Over-staining or under-staining of each dye can be digitally fixed using the digital stainer embodied in one or more of the methods and systems.

An example of the method for digitally enhancing an initial image of a material to which a plurality of stains were previously applied, generally comprises the steps of: unmixing the initial image into a plurality of individual reconstructed images, each individual image corresponding to one of the stains; estimating a residual image corresponding to a difference between the initial image and the unmixed reconstructed images adjusting one or more components of the individual reconstructed images; mixing the adjusted components; and adding the residual image to the mixed adjusted components to generate an enhanced image. The method may further comprise the step of, estimating one or more mixing coefficients for the stains prior to adjusting one or more components of the individual images; and mixing the adjusted components using the estimated mixing coefficients.

In one non-limiting example, the image is of a material to which hemotoxylin and eosin stains were applied and wherein at least two of the unmixed individual images correspond to hemotoxylin and eosin. Although the material of the image may comprise a variety of samples, one non-limiting example comprises a biological tissue sample, such but not limited to a tissue sample that comprises abnormal cells.

The image of material may comprises a color image, wherein the method may include the step of adjusting comprises increasing or decreasing a saturation or contrast level of an intensity in the image.

An embodiment of the system of the invention, for digitally enhancing an initial image of a material to which a plurality of stains were previously applied, generally comprises: a memory component for at least temporarily storing the image of the material; a processor that unmixes the image into a plurality of individual reconstructed images, each individual image corresponding to one of the stains; estimates a residual image corresponding to a difference between the initial image and the reconstructed images; adjusts one or more components of the individual images; mixes the adjusted (components) using estimated mixing coefficients; and adds the residual image to the mixed adjusted (components) to generate an enhanced image; and a display device for displaying the enhanced image. The system may further comprise an imaging device for creating the image of the material. The imaging device may be, but is not limited to, a brightfield microscope.

The system may further comprise an automated subsystem for applying the plurality of stains to the material, wherein the material may comprise, but is not limited to, samples of biological tissues.

The methods and systems may be used for any purpose in which a material is stained and it is advantageous to the given purpose to enhance one or more of the components of the image. Such purposes include, but are not limited to, research and clinical analysis of biological materials to which dyes or other biomarkers are applied to reveal characteristics or features of the materials; enhancement of digital images of materials to simply clean up or otherwise improve the clarity or other quality or characteristic of the images; quality control of laboratory equipment and instrumentation that rely on digital imagery; and digital image postprocessing such as increasing the performance of existing image segmentation methodologies.

DRAWINGS

These and other features, aspects, and advantages of the present invention will become better understood when the following detailed description is read with reference to the accompanying drawings in which like characters represent like parts throughout the drawings, wherein.

Figure 4:
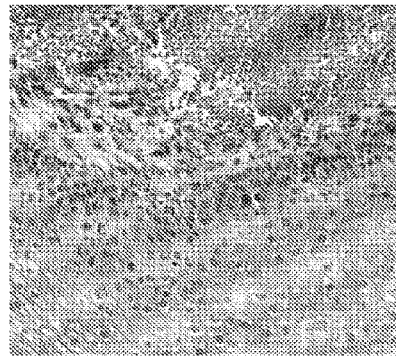
Figure 4:
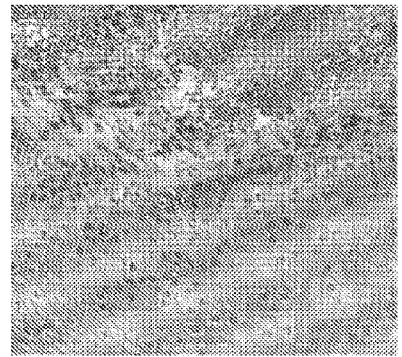
Figure 4:
Figure 4:
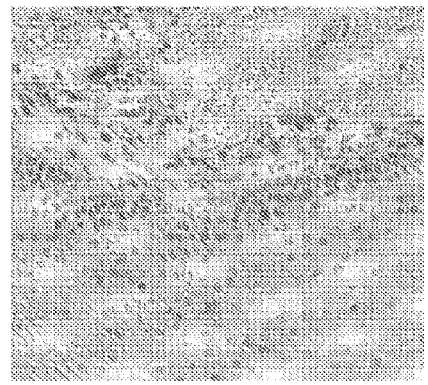
Figure 4:
Figure 4:
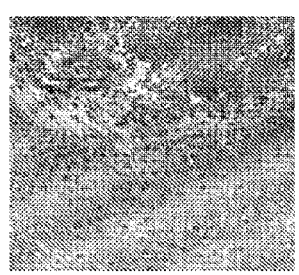
Figure 4:
Figure 5:
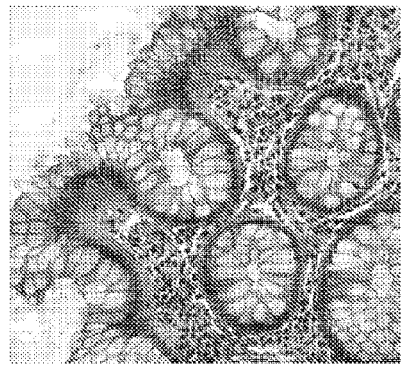
Figure 5:
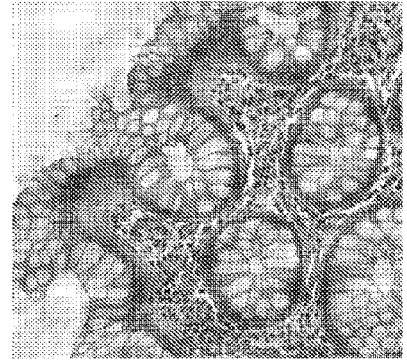
Figure 5:
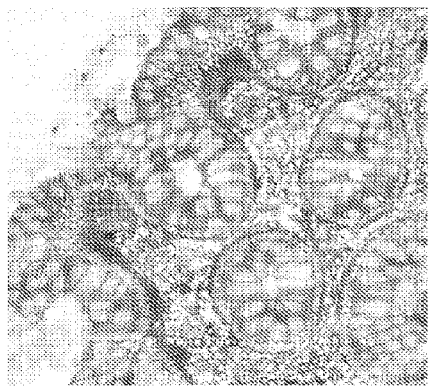
Figure 5:
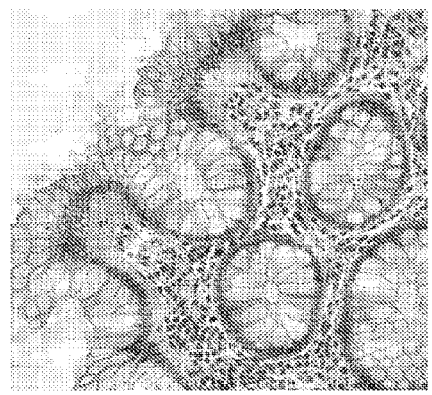
Figure 5:
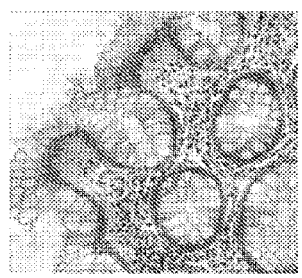
Figure 5:
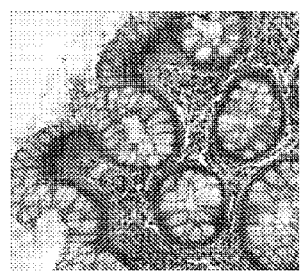
Figure 5:
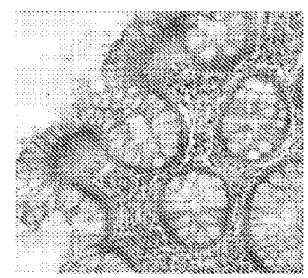

FIG. 4 is a series (a)-(g) of an example image, wherein series (a)-(g) correspond to the (a) original image, (b) reconstructed image, (c) estimated eosin, (d) estimated hematoxylin, (e) red channel, (f) green channel, and (g) blue channel FIG. 5 is a series (a)-(g) of an example image, wherein series (a)-(g) correspond to the (a) original image, (b) reconstructed image, (c) estimated eosin, (d) estimated hematoxylin, (e) red channel, (f) green channel, and (g) blue channel.

Figure 6:
Figure 6:
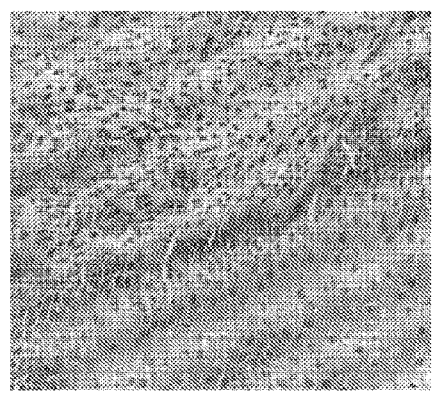
Figure 6:
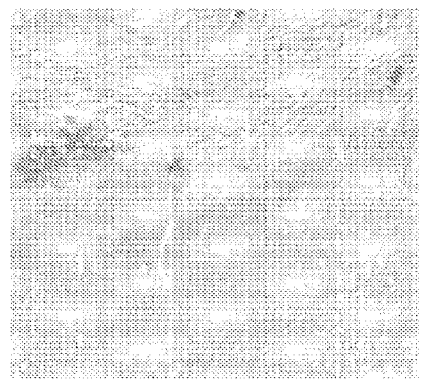
Figure 6:
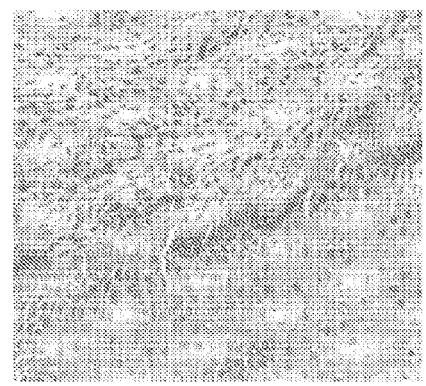
Figure 6:
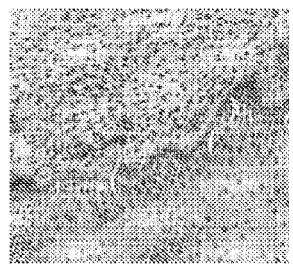
Figure 6:
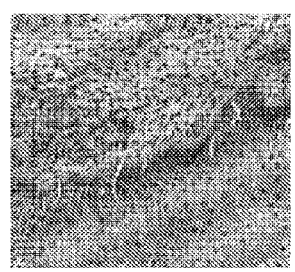
Figure 6:

FIG. 6 is a series (a)-(g) of an example image, wherein series (a)-(g) correspond to the (a) original image, (b) reconstructed image, (c) estimated eosin, (d) estimated hematoxylin, (e) red channel, (f) green channel, and (g) blue channel.

Figure 7:
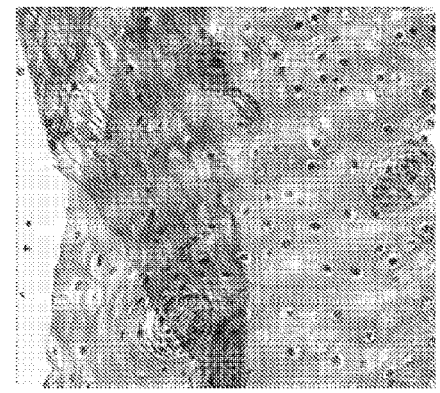
Figure 7:
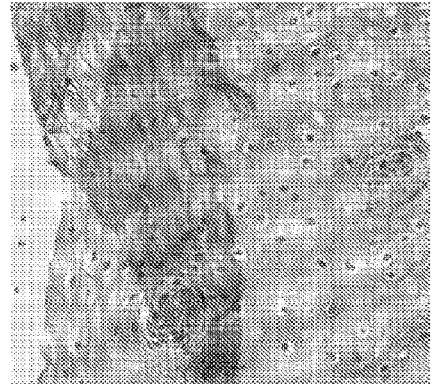
Figure 7:
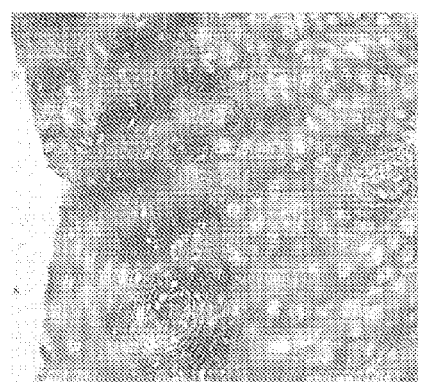
Figure 7:
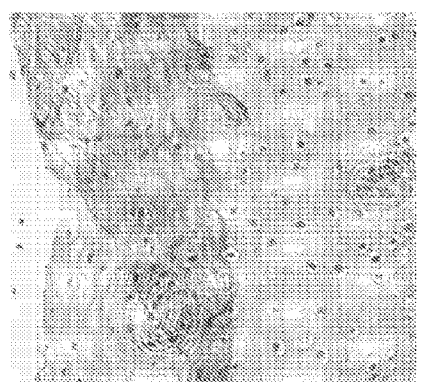
Figure 7:
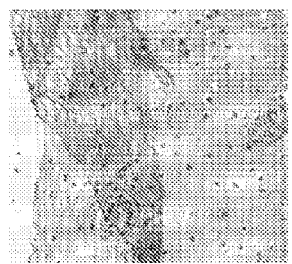
Figure 7:
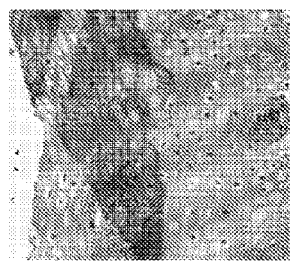
Figure 7:
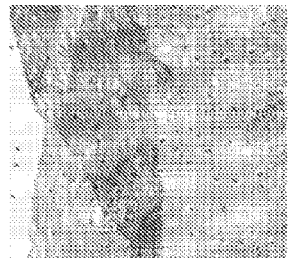

FIG. 7 is a series (a)-(g) of an example image, wherein series (a)-(g) correspond to the (a) original image, (b) reconstructed image, (c) estimated eosin, (d) estimated hematoxylin, (e) red channel, (f) green channel, and (g) blue channel.

Figure 8:
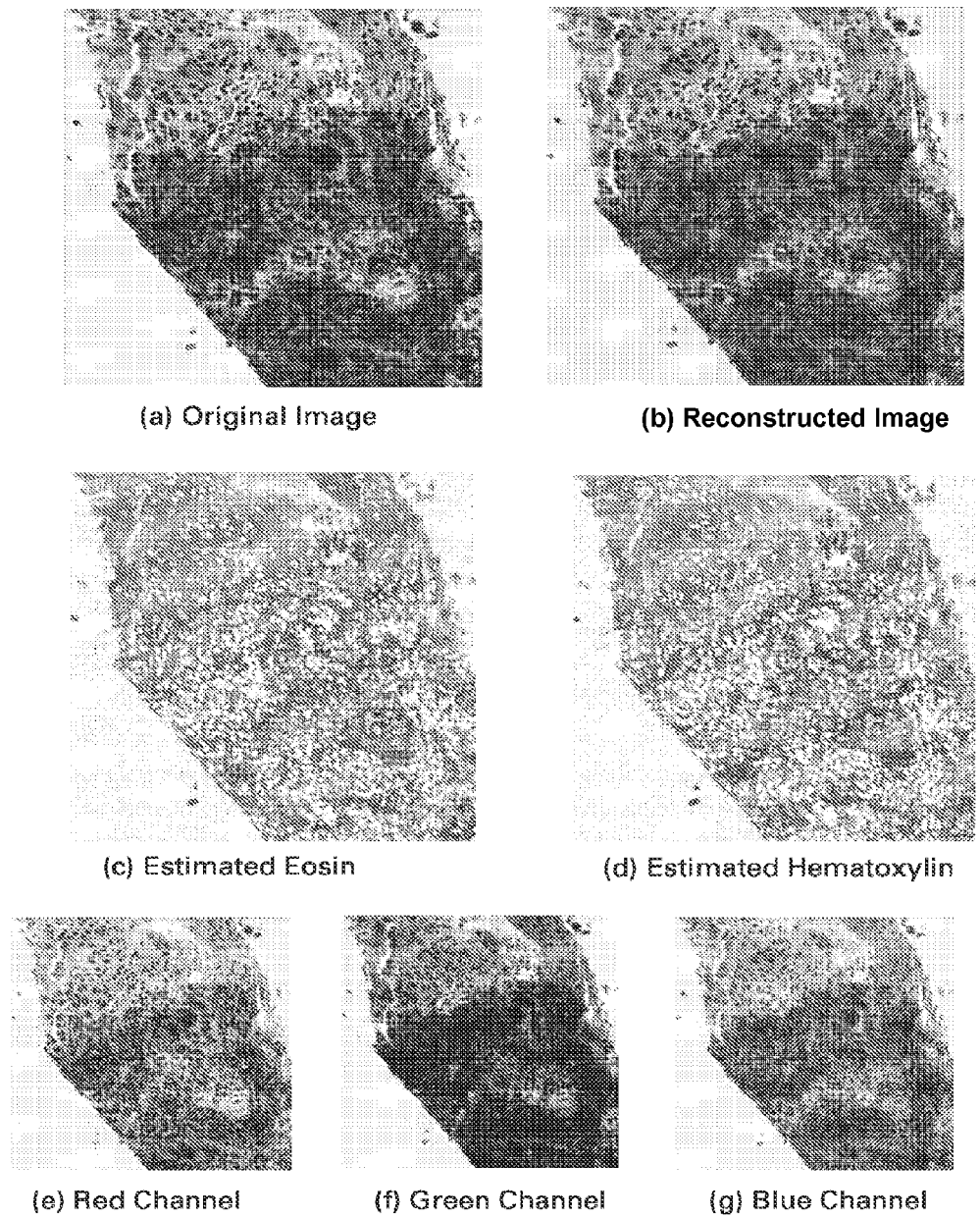

FIG. 8 is a series (a)-(g) of an example image, wherein series (a)-(g) correspond to the (a) original image, (b) reconstructed image, (c) estimated eosin, (d) estimated hematoxylin, (e) red channel, (f) green channel, and (g) blue channel.

Figure 3:
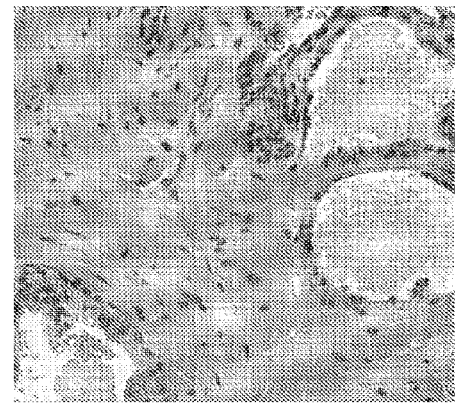
FIG. 3 is a series (a)-(g) of an example image, wherein series (a)-(g) correspond to the (a) original image, (b) reconstructed image, (c) estimated eosin, (d) estimated hematoxylin, (e) red channel, (f) green channel, and (g) blue channel.
Figure 3:
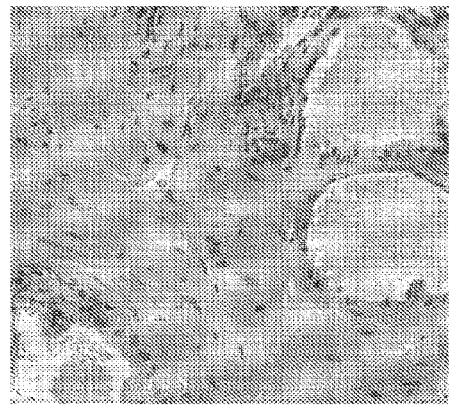
Figure 3:
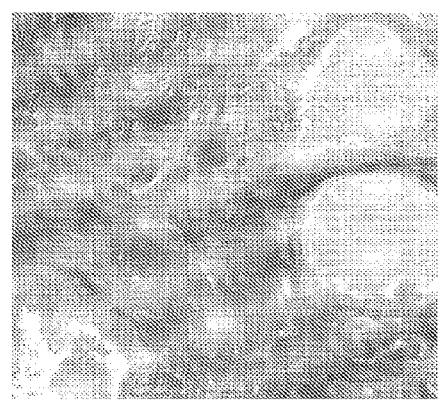
Figure 3:
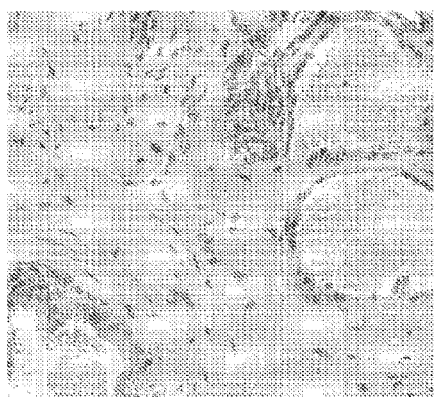
Figure 3:
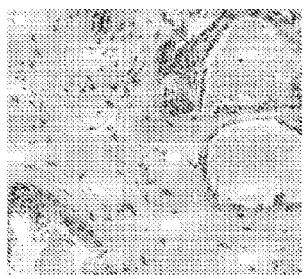
Figure 3:
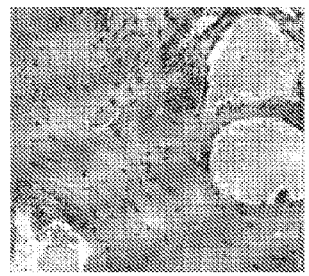
Figure 3:
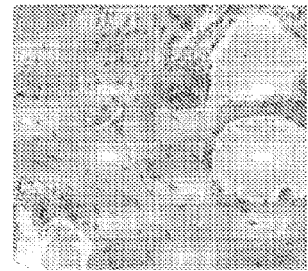
Figure 9:
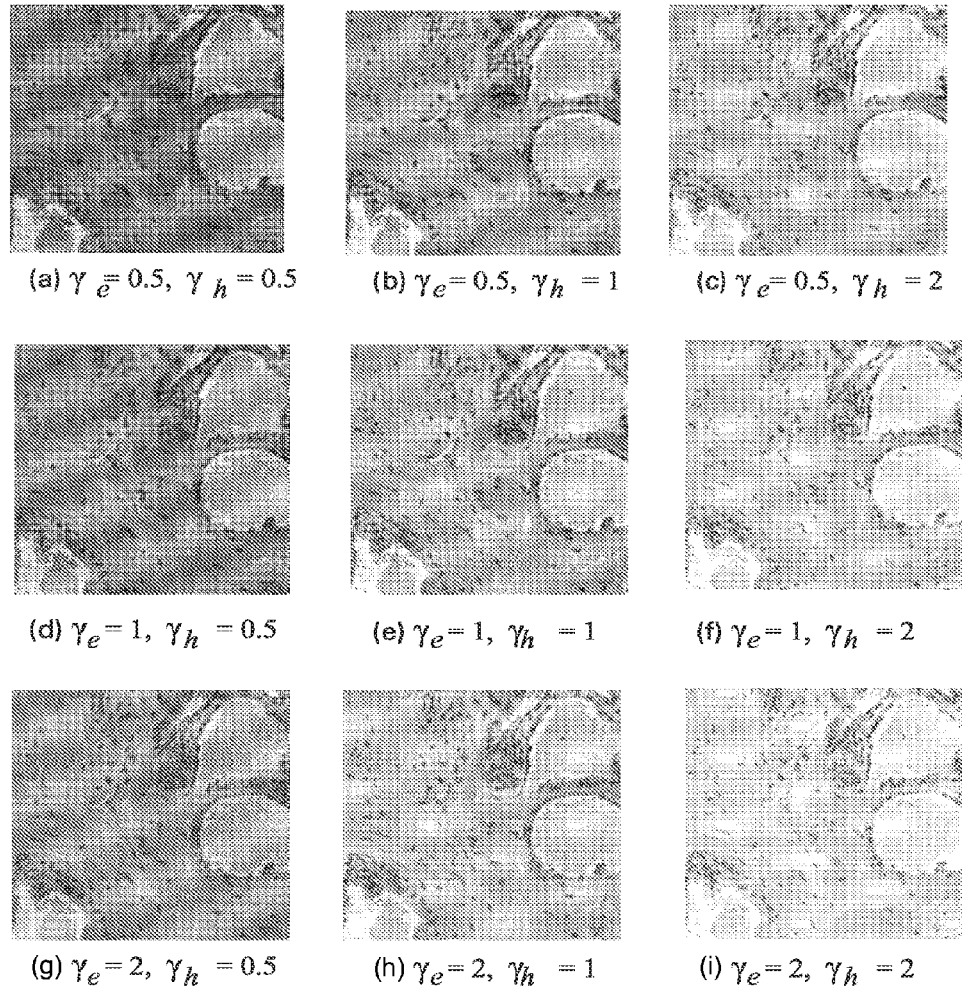

FIG. 9 is a series (a)-(i) of the example image of FIG. 3 to which nine variations of an example of the methods is applied.

Figure 10:
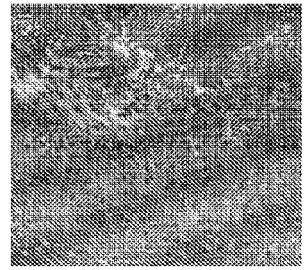
Figure 10:
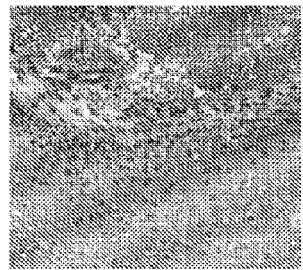
Figure 10:
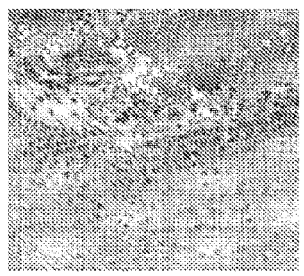
Figure 10:
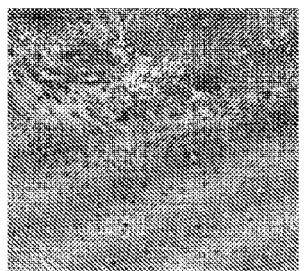
Figure 10:
Figure 10:
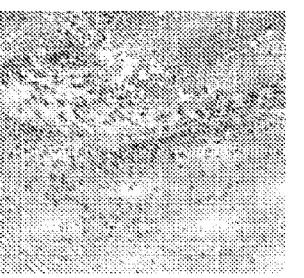
Figure 10:
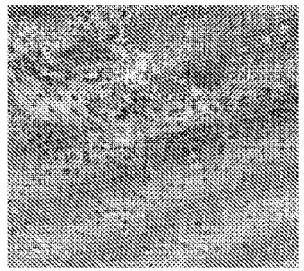
Figure 10:
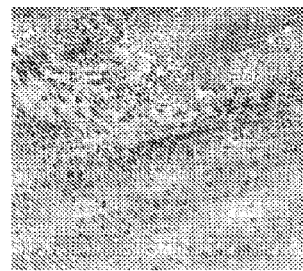
Figure 10:
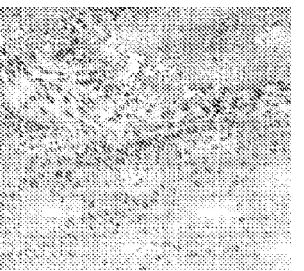

FIG. 10 is a series (a)-(i) of the example image of FIG. 4 to which nine variations of an example of the methods is applied.

Figure 11:
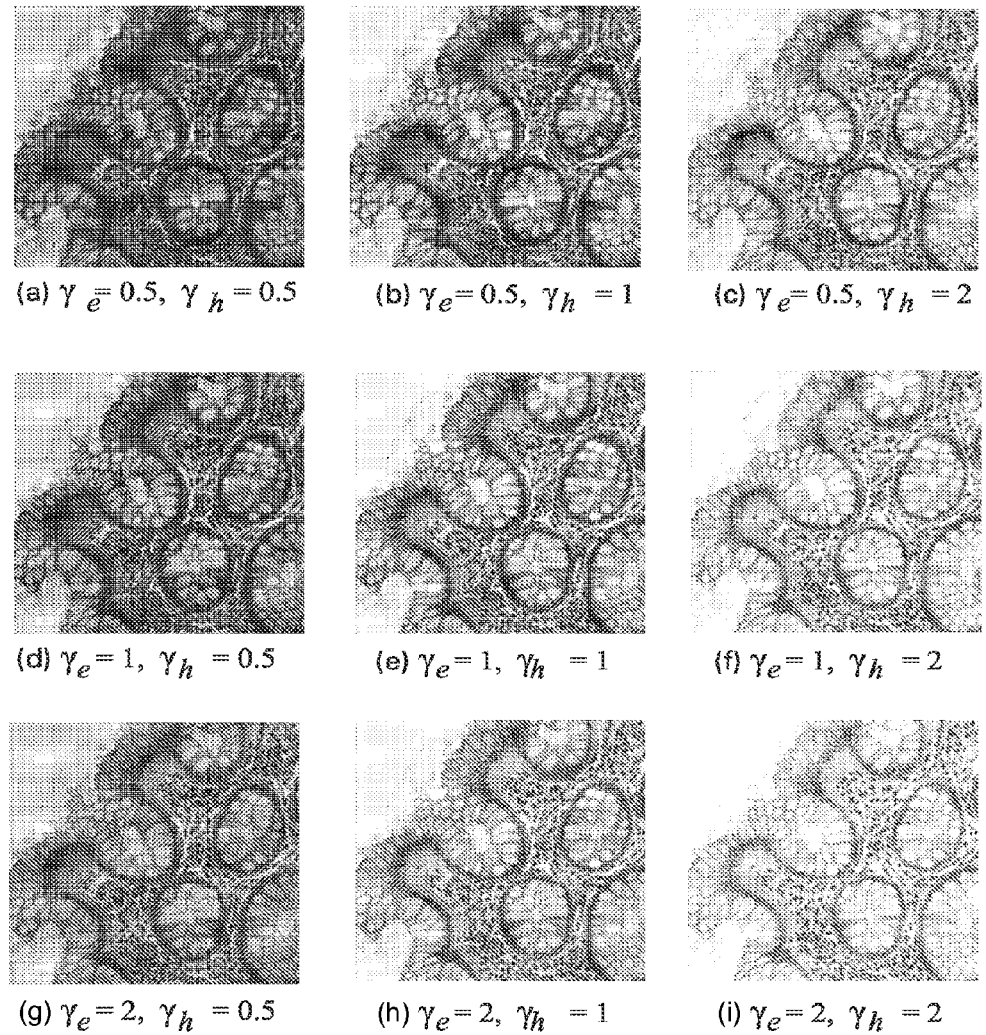

FIG. 11 is a series (a)-(i) of the example image of FIG. 5 to which nine variations of an example of the methods is applied.

Figure 12:
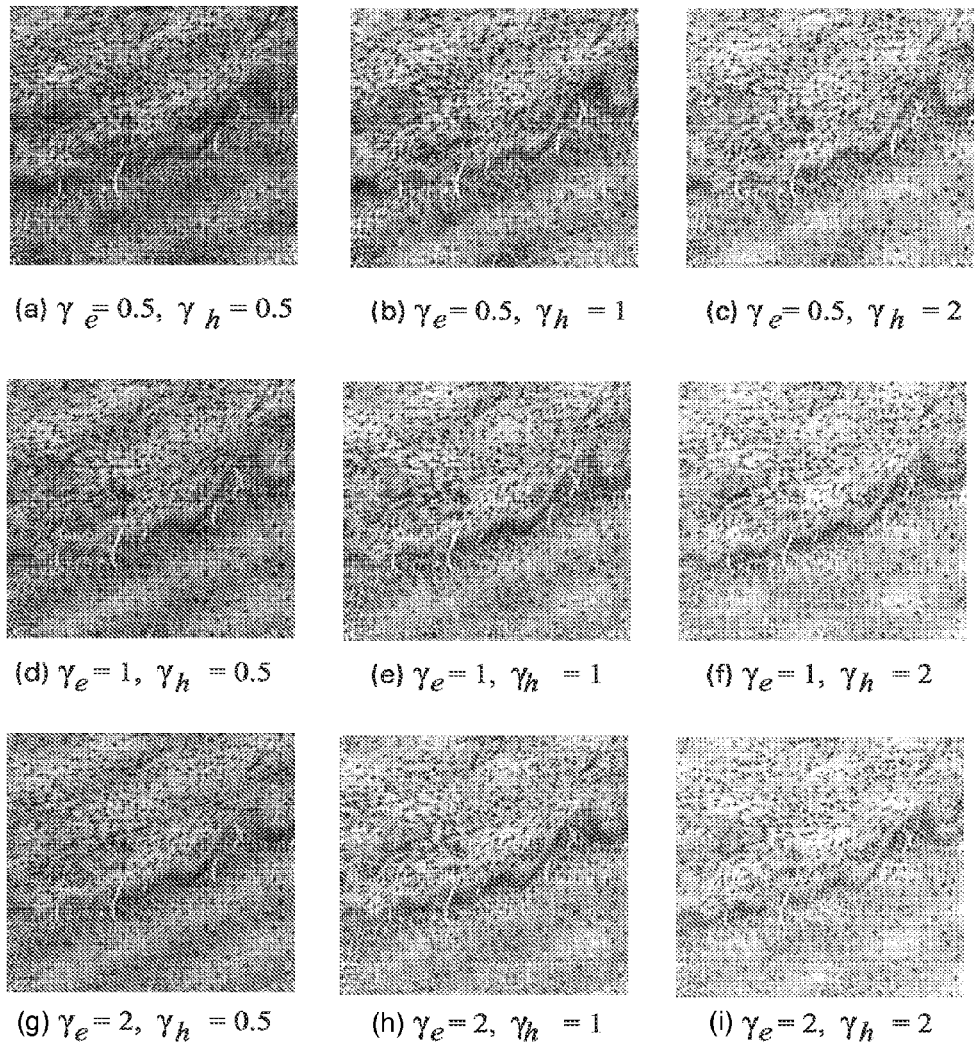

FIG. 12 is a series (a)-(i) of the example image of FIG. 6 to which nine variations of an example of the methods is applied.

Figure 13:
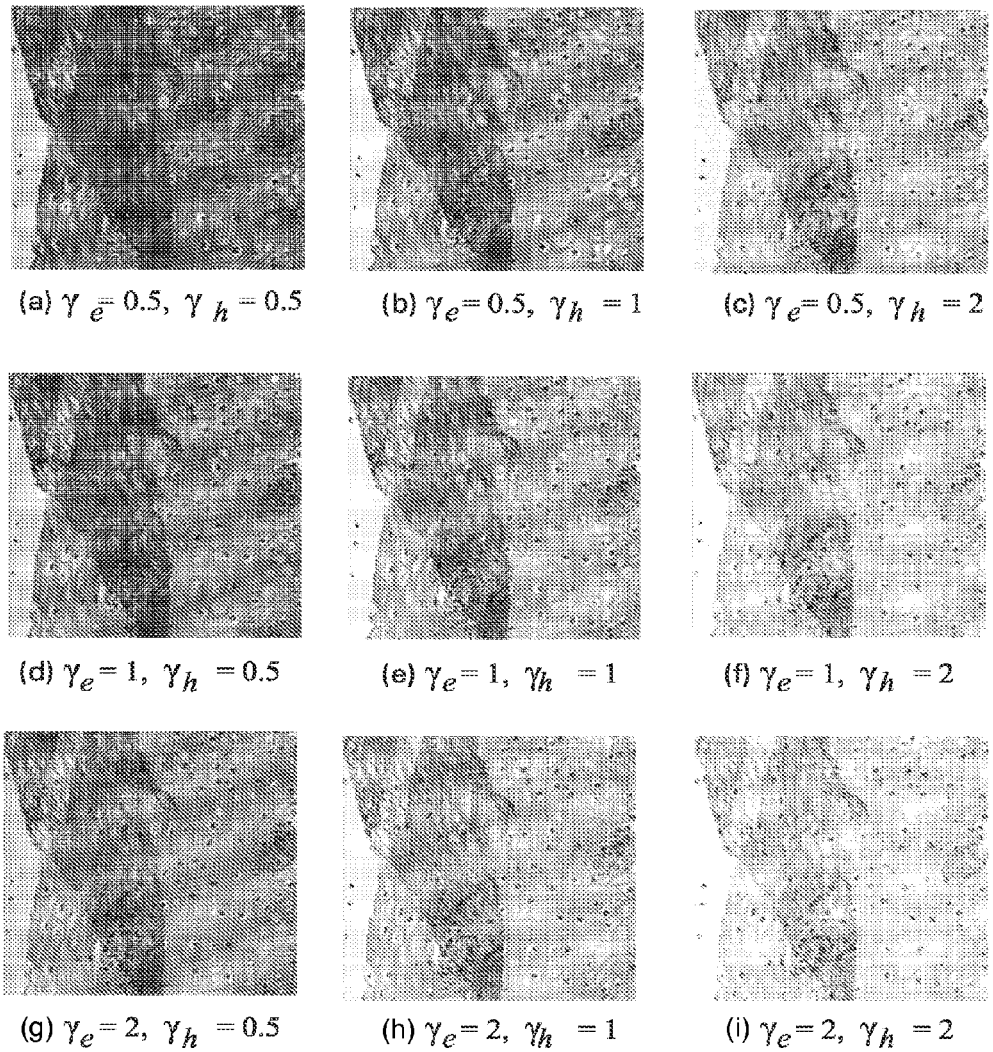

FIG. 13 is a series (a)-(i) of the example image of FIG. 7 to which nine variations of an example of the methods is applied.

Figure 14:
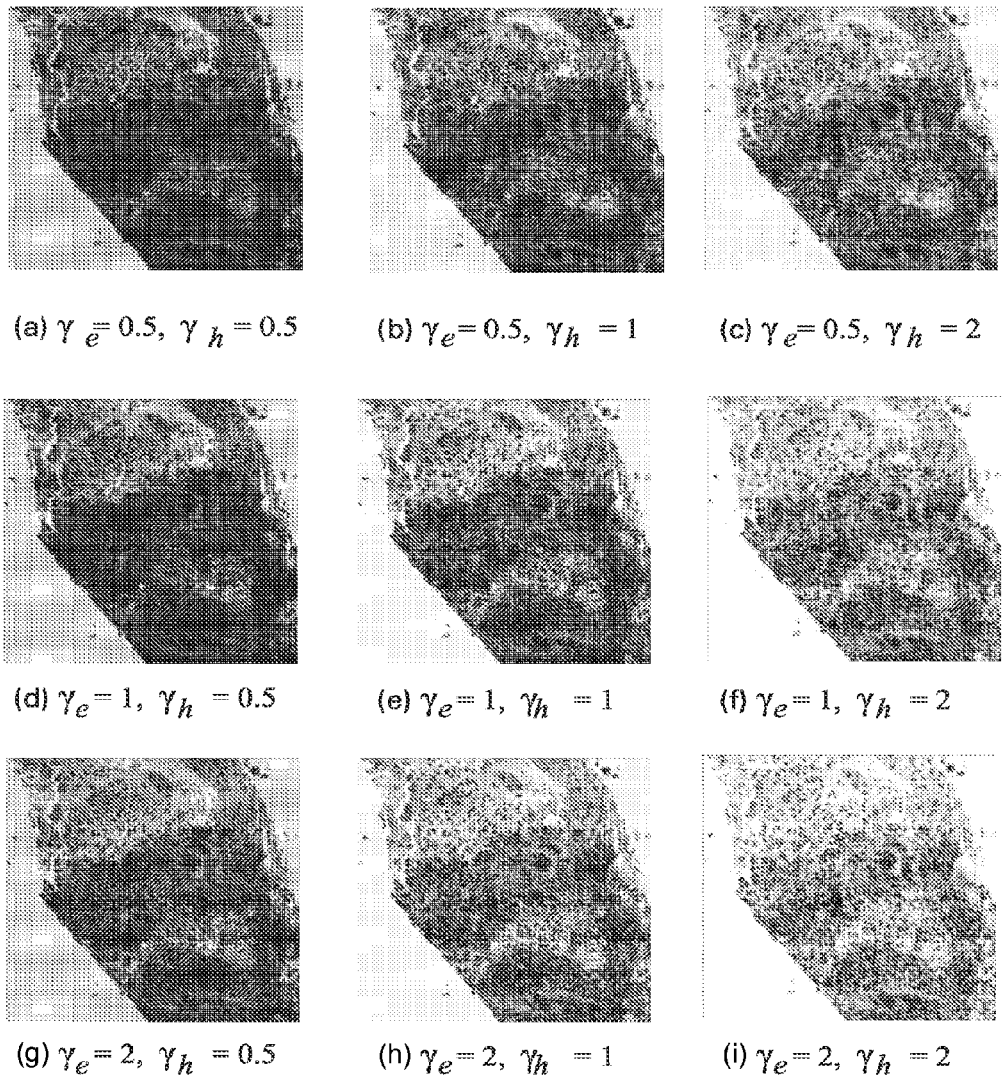

FIG. 14 is a series (a)-(i) of the example image of FIG. 8 to which nine variations of an example of the methods is applied.

Figure 15:
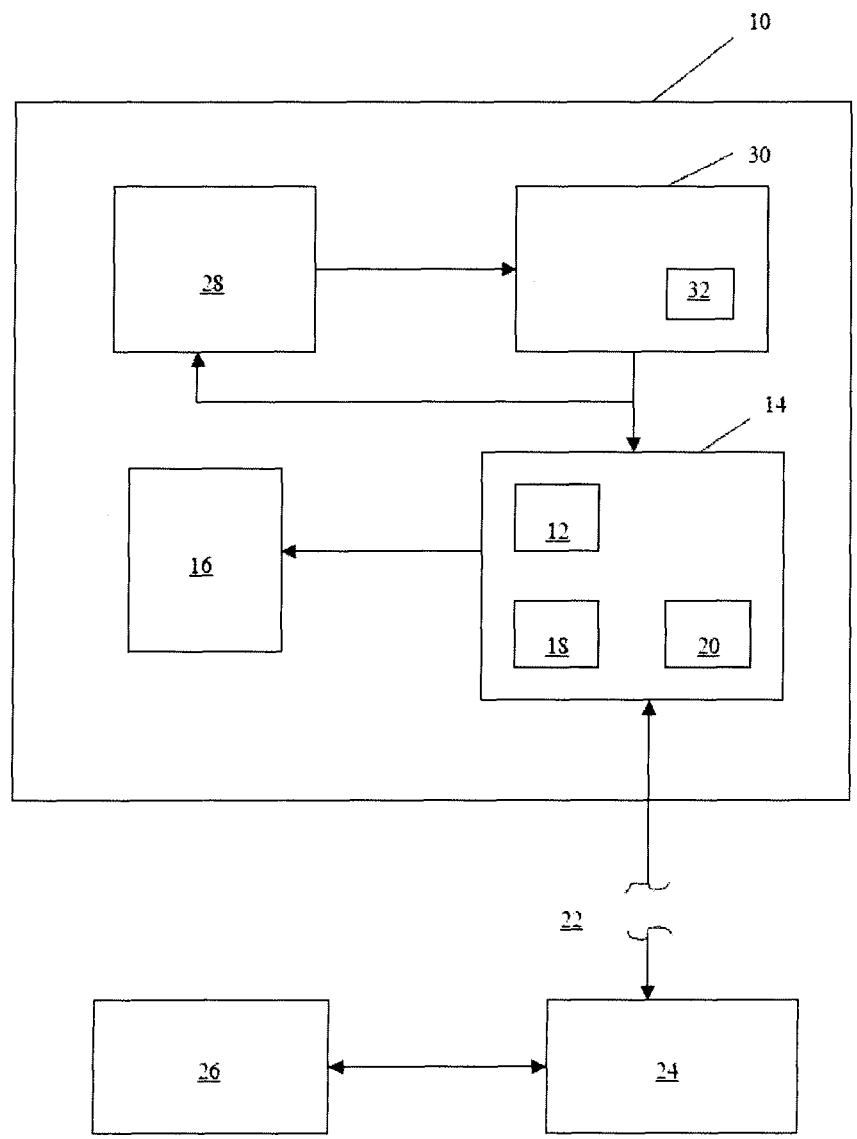

FIG. 15 is a diagram of an embodiment of the automated system of the invention.

DETAILED DESCRIPTION

To more clearly and concisely describe and point out the subject matter of the claimed invention, the following definitions are provided for specific terms, which are used in the following description and the appended claims.

As used herein, the term "stain" includes, but is not limited to, dyes, biomarkers, channel markers, fluorescent imaging agents and fluorophores. For example, fluorophores are chemical compounds, which when excited by exposure to a particular wavelength of light, emit light at a different wavelength. Fluorophores may be described in terms of their emission profile, or "color." Green fluorophores (for example Cy3, FITC, and Oregon Green) may be characterized by their emission at wavelengths generally in the range of 515-540 nanometers. Red fluorophores (for example Texas Red, Cy5, and tetramethylrhodamine) may be characterized by their emission at wavelengths generally in the range of 590-690 nanometers. An examples of an orange fluorophore is a derivative of 1,5-bis{[2-(di-methylamino) ethyl]amino}-4,8-dihydroxyanthracene-9,10-dione (CyTRAK Orange™) that stains both nucleus and cytoplasm, and examples of far-red fluorophores are 1,5-bis{[2-(di-methylamino) ethyl]amino}-4,8-dihydroxyanthracene-9,10-dione (DRAQ5™) a fluorescent DNA dye and 1,5-bis({[2-(di-methylamino) ethyl]amino}-4,8-dihydroxyanthracene-9,10-dione)-N-Oxide-(APOPTRAK™) a cellular probe. Examples of fluorophores include, but are not limited to, 4-acetamido-4'-isothiocyanatostilbene-2,2'disulfonic acid, acridine, derivatives of acridine and acridine isothiocyanate, 5-(2'-aminoethyl)aminonaphthalene-1-sulfonic acid (EDANS), 4-amino-N-[3-vinylsulfonyl)phenyl]naphthalimide-3,5 disulfonate (Lucifer Yellow VS), N-(4-anilino-1-naphthyl)maleimide, anthranilamide, Brilliant Yellow, coumarin, coumarin derivatives, 7-amino-4-methylcoumarin (AMC, Coumarin 120), 7-amino-trifluoromethylcouluarin (Coumaran 151), cyanosine; 4',6-diaminidino-2-phenylindole (DAPI), 5',5"-dibromopyrogallol-sulfonephthalein (Bromopyrogallol Red), 7-diethylamino-3-(4'-isothiocyanatophenyl)-4-methylcoumarin, -, 4,4'-diisothiocyanatodihydro-stilbene-2,2'-disulfonic acid, 4,4'-diisothiocyanatostilbene-2,2'-disulfonic acid, 5-[dimethylamino]naphthalene-1-sulfonyl chloride (DNS, dansyl chloride), eosin, derivatives of eosin such as eosin isothiocyanate, erythrosine, derivatives of erythrosine such as erythrosine B and erythrosin isothiocyanate; ethidium; fluorescein and derivatives such as 5-carboxyfluorescein (FAM), 5-(4,6-dichlorotriazin-2-yl) aminofluorescein (DTAF), 2'7'-dimethoxy-4'5'-dichloro-6-carboxyfluorescein (JOE), fluorescein, fluorescein isothiocyanate (FITC), QFITC (XRITC); fluorescamine derivative (fluorescent upon reaction with amines); IR144; IR1446; Malachite Green isothiocyanate; 4-methylumbelliferone; ortho cresolphthalein; nitrotyrosine; pararosaniline; Phenol Red, B-phycoerythrin; o-phthaldialdehyde derivative (fluorescent upon reaction with amines); pyrene and derivatives such as pyrene, pyrene butyrate and succinimidyl 1-pyrene butyrate; Reactive Red 4 (Cibacron® Brilliant Red 3B-A), rhodamine and derivatives such as 6-carboxy-X-rhodamine (ROX), 6-carboxyrhodamine (R6G), lissamine rhodamine B sulfonyl chloride, rhodamine (Rhod), rhodamine B, rhodamine 123, rhodamine X isothiocyanate, sulforhodamine B, sulforhodamine 101 and sulfonyl chloride derivative of sulforhodamine 101 (Texas Red); N,N,N',N'-tetramethyl-6-carboxyrhodamine (TAMRA); tetramethyl Rhodamine, tetramethyl rhodamine isothiocyanate (TRITC); riboflavin; rosolic acid and lathanide chelate derivatives, quantum dots, cyanines, pyrelium dyes, and squaraines.

As used herein, the term "biological material" refers to a sample obtained from a biological subject, including sample of biological tissue or fluid origin obtained in vivo or in vitro. Such samples can be, but are not limited to, body fluid (e.g., blood, blood plasma, serum, or urine), organs, tissues, fractions, and cells isolated from mammals including, humans. Biological samples also may include sections of the biological sample including tissues (e.g., sectional portions of an organ or tissue). Biological samples may also include extracts from a biological sample, for example, an antigen from a biological fluid (e.g., blood or urine).

A biological sample may be of prokaryotic origin or eukaryotic origin (e.g., insects, protozoa, birds, fish, reptiles). In some embodiments, the biological sample is mammalian (e.g., rat, mouse, cow, dog, donkey, guinea pig, or rabbit). In certain embodiments, the biological sample is of primate origin (e.g., example, chimpanzee, or human).

A biological sample may include any sample regardless of its physical condition, such as, but not limited to, being frozen or stained or otherwise treated. In some embodiments, a biological sample may include compounds which are not naturally intermixed with the sample in nature such as preservatives, anticoagulants, buffers, fixatives, nutrients, antibiotics, or the like.

In some embodiments, a biological sample may include a tissue sample, a whole cell, a cell constituent, a cytospin, or a cell smear. In some embodiments, a biological sample essentially includes a tissue sample. A tissue sample may include a collection of similar cells obtained from a tissue of a biological subject that may have a similar function. In some embodiments, a tissue sample may include a collection of similar cells obtained from a tissue of a human. Suitable examples of human tissues include, but are not limited to, (1) epithelium; (2) the connective tissues, including blood vessels, bone and cartilage; (3) muscle tissue; and (4) nerve tissue. The source of the tissue sample may be solid tissue obtained from a fresh, frozen and/or preserved organ or tissue sample or biopsy or aspirate; blood or any blood constituents; bodily fluids such as cerebral spinal fluid, amniotic fluid, peritoneal fluid, or interstitial fluid; or cells from any time in gestation or development of the subject. In some embodiments, the tissue sample may include primary or cultured cells or cell lines.

In some embodiments, a biological sample includes tissue sections from healthy or diseases tissue samples (e.g., tissue section from colon, breast tissue, prostate). A tissue section may include a single part or piece of a tissue sample, for example, a thin slice of tissue or cells cut from a tissue sample. In some embodiments, multiple sections of tissue samples may be taken and subjected to analysis, provided the methods disclosed herein may be used for analysis of the same section of the tissue sample with respect to at least two different targets (at morphological or molecular level). In some embodiments, the same section of tissue sample may be analyzed with respect to at least four different targets (at morphological or molecular level). In some embodiments, the same section of tissue sample may be analyzed with respect to greater than four different targets (at morphological or molecular level). In some embodiments, the same section of tissue sample may be analyzed at both morphological and molecular levels.

In some embodiments, a biological sample or the targets in the biological sample may be adhered to a solid support when an image of the biological material is fixed using an imaging device. A solid support may include, but is not limited to, microarrays (e.g., DNA or RNA microarrays), gels, blots, slides, beads, or ELISA plates.

The methods and systems can be used to adjust images of virtually any type of biological material that has been stained, such as but not limited to, materials used in analytical, diagnostic, or prognostic applications such as analyte detection, multiplexing, histochemistry, immunohistochemistry, or immunofluorescence. In some embodiments, the methods and systems may be particularly applicable in histochemistry, immunostaining, immunohistochemistry, immunoassays, or immunofluorescence. In some embodiments, the methods and systems may be particularly applicable in immunoblotting techniques, for example, western blots or immunoassays such as enzyme-linked immunosorbent assays (ELISA).

Generally, the methods and systems of the invention adjust the contrast of individual dyes in a color (red-green-blue) image of a biological material to which a plurality of stains have been applied. The methods generally first unmix the color image into individual dye components. Then each of the dye components is adjusted, and then the adjusted individual dyes are remixed to generate adjusted color images. An example of this method is shown generally as a flow diagram in FIG. 1. The multichannel image is provided an input to the methods embodied in the digital stainer of the invention. The digital stainer unmixes the image into individual components. The unmixing is not exact and therefore the reconstructed image is an approximation of the original image. By subtracting the original channels from the reconstructed channels, the residuals can be calculated. The individual dyes extracted from the image in the unmixing steps are then adjusted. The adjustment can be carried out using various methodologies such as, but not limited to, histogram equalization, gamma correction and brightness adjustment. After adjusting the individual dyes, the image is reconstructed using the residuals and the adjusted individual dyes.

Figure 2:
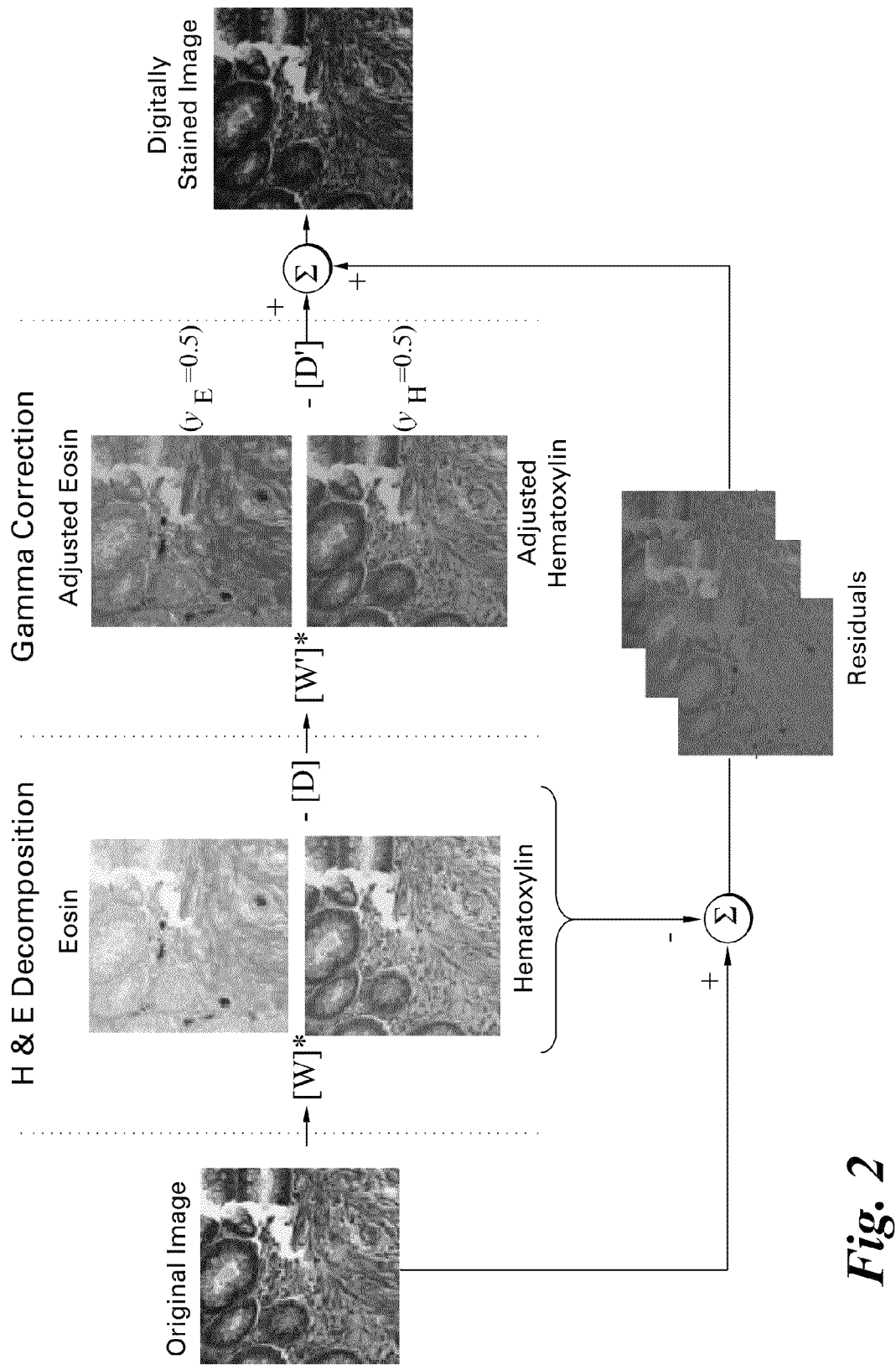
FIG. 2 is a schematic diagram of the example of the method shown in FIG. 1.

FIG. 2 is a schematic diagram of an example of the method of the invention generally showing the workflow of the digital stainer on H & E images. The workflow shown in FIG. 2 illustrates an example where an H & E stained RGB image is processed. The image is decomposed into eosin and hemotoxylin channels using non-negative matrix factorization. These individual dyes are then mixed to form an approximation of the original channels. The original channels are then subtracted from the reconstructed channels to obtain the residual images. Then the eosin and hematoxylin dyes are then adjusted using gamma correction. By using gamma values less than 1, both the eosin and hemotoxylin dyes are increased. The adjusted images are then mixed together and the residuals are added to form the resulting digitally stained image.

One example of a use of the methods is the digital adjustment of the staining proportions images of H&E stained tissue. First, color images of the H&E stained material is unmixed into individual hematoxylin and eosin components. The physical dye mixing is an additive process where each dye can only attenuate the light under a bright field microscope. In this example, the mixing process uses a non-negative mixing equation, in which the individual components are solved using non-negative matrix (NMF) factorization.

Generally, NMF is a class of matrix factorizations of the form A=WS where A is the original n×m matrix, also called the observation matrix, W is the n×r mixing matrix and S is the n×m factor matrix. The only common property that all non-negative matrix factorizations share is the constraint that A, W and S all being greater or equal to zero. Because of this non-negativity constraint mixing of the factors can indeed be interpreted as addition of the factors and factors as the parts of the observation matrix. Previous use of non-negative matrix factorization fails to normalize images for dark current, which is solved by the methods of the invention. Dark current is the constant response exhibited, in the absence of light, by many types of radiation receptors. One or more of the embodiments use a variable smoothing step using a Gaussian filter with a standard deviation that decreases at each iteration. This helps to constrain the computed solution, by reducing the noise while retaining the details in the images.

The NMF estimates the mixing proportions as well as the individual components such as H and E. The methods may also use additive terms to incorporate image intensity bias due to dark current. The estimated components are then adjusted for contrast, hence changing the dye proportions. Possible contrast adjustments include, brightness and contrast adjustment, gamma adjustment, and histogram equalization.

In some applications, due to the variety of stains and biological materials, the stains may not always accurately represent the dye mixtures. To ensure an exact reproduction when the gamma values are set to unity, a residual image is calculated. The gamma corrected channels, such as H and E channels, are then mixed with the estimated mixing coefficients and the residual image is added. By changing the gamma values each of the H and E dyes can be reduced or increased. These methods will composite for the over or under staining of each of the individual dyes. For example, if H is over-stained it can be digitally reduced, by setting the proper gamma value. If E is under-stained it can be digitally amplified.

The methods can be used to adjust multiple channel images and are not limited to red, green, blue (RGB) images. Following are non-limiting examples used to illustrate various embodiments of the methods and systems.

EXAMPLE 1

Figure 1:
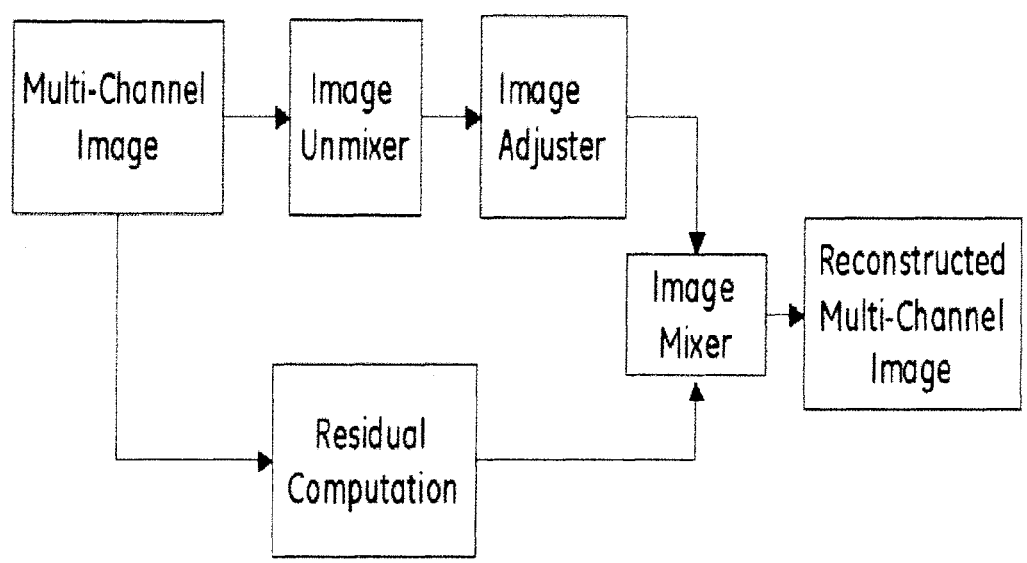
FIG. 1 is a flow diagram of an example of the method of the invention for digitally adjusting the color, shading or intensity of an image.

Given an RGB image, the method of this example comprises first unmixing the original image into H and E components. The unmixing process estimates a mixing matrix that models the image absorption process. A set of RGB residuals are calculated to capture the structures such as pigments that are not represented by the H and E mixtures. The residuals are estimated by subtracting the reconstructed channels (by mixing the H and E using the mixing matrix) from the original channels. The unmixed H and E components are then adjusted using, but not limited to, γ correction, histogram equalization, and brightness adjustment. The adjusted images are mixed and the residuals added to form a digitally stained reconstructed image. As noted, FIG. 1 illustrates the general steps of this example of a method for digitally adjusting stains in an image.

In this example, the RGB images are stained with H and E. The individual components of the observed image are stored in a matrix where each row represents one of the input channels. The input is a 3 by N matrix where N represents the number of pixels in the image. Matrix decomposition is performed on this matrix to obtain the individual base images. The decomposition step used in this example is NMF. Other nonlimiting examples of alternative deposition steps comprise Singular Value Decomposition (SVD), Principal Component Analysis (PCA), Independent Component Analysis, and Tucker. PCA, after subtracting the mean and normalizing the data, finds orthogonal axes that correspond to the directions along the largest, second largest, third largest (and so on) variances. ICA depends on the assumption of statistical independence of the base images, but doe not enforce non-negative on the base image or the mixing coefficients. NMF is advantageous in this example because it constrains the base images, as well as the mixing matrix, to be non-negative. As a result, the decomposed images are additive, not subtractive. By using NMF as the image unmixing step to extract the eosin and hematoxylin parts of the images, useful information about how the connected tissue, red blood cells, cell nuclei are scattered, can be extracted from the image.

For each image acquired using the brightfield microscope, the red, green and blue channels are extracted. The image formation of brightfield H&E slides is based on the absorption of the individual dyes, and can be formulated as follows:

$$\begin{bmatrix} R \\ G \\ B \end{bmatrix} = \begin{bmatrix} M_R \\ M_G \\ M_B \end{bmatrix} - \begin{bmatrix} w_{11} & w_{12} \\ w_{21} & w_{22} \\ w_{31} & w_{32} \end{bmatrix} \begin{bmatrix} E \\ H \end{bmatrix} + \begin{bmatrix} d_R \\ d_G \\ d_B \end{bmatrix}. \quad (1)$$

where $[M_R, M_G, M_B]^T$ and $[d_R, d_G, d_B]^T$ represent the absorption free intensity values and camera dark current for each channel, respectively. Note that for white balanced images, $M_R, M_G, M_B$ have equal values.

Multiplying both sides of the equation 1 by negative 1 and adding $[M_R, M_G, M_B]^T$ results in:

$$\begin{bmatrix} R' \\ G' \\ B' \end{bmatrix} = \begin{bmatrix} w_{11} & w_{12} \\ w_{21} & w_{22} \\ w_{31} & w_{32} \end{bmatrix} \begin{bmatrix} E \\ H \end{bmatrix} - \begin{bmatrix} d_R \\ d_G \\ d_B \end{bmatrix}. \quad (2)$$

where $$\begin{bmatrix} R' \\ G' \\ B' \end{bmatrix} = \begin{bmatrix} M_R - R \\ M_G - G \\ M_B - B \end{bmatrix}.$$

Equation (2) can be written in a non-negative matrix factorization formulation as, $$A = WS - D. \quad (3)$$

Matrix A

The images in the rows of $A_{3 \times n}$ are the inputs to the algorithm and they contain the R', G' and B' components. The entries of A are non-negative since they represent image pixels.

Matrix W

The (i, j) entry of the real 3×2 matrix W is defined to be $w_{i,j}$ where $w_{i,j}$ satisfies equation (2), for any integer i and j such that $1 \le i \le 3$ and $1 \le j \le 2$. The entries in W specify how much eosin and how much hematoxylin is present in each of the images in A. More specifically, $w_{i,1}$ and $w_{i,2}$ specify how much eosin and hematoxylin is in R', G', B' channels respectively.

Matrix S

In the real $S_{2 \times n}$ matrix $$S = \begin{bmatrix} E \\ H \end{bmatrix}, \quad (4)$$

the first row contains an estimate of the eosin component and the second row contains an estimate of the hematoxylin component. The matrix S is known as the source matrix. The entries in S are also non-negative as they represent image pixels.

Matrix D

The (i, j) entry of the real m×n matrix D is defined to be $d_i$. It follows that all columns of D are identical, and hold the dark currents $d_i$ of each of the m images. Since dark current acts additively, the variables $d_i$ are constrained to be non-negative, so the entries of D are all non-negative.

All entries in all the matrices in equation (3) are non-negative. Therefore, the model derived here constitutes a non-negative matrix factorization model. Because the dark current terms in matrix D are part of the model, equation (3) is generally referred to herein as an extended non-negative matrix factorization.

The first step of the NMF unmixing algorithm is to estimate W and D, holding S fixed. That is the new matrices W and D solve the optimization problem $$[W, D] = \mathrm{argmin}_{\{\tilde{W}, \tilde{D}: \tilde{w}_{i,j} \geq 0, \tilde{d}_{i,j}\}} \left\| A - [\tilde{W}, \tilde{D}] \begin{bmatrix} S \\ -1 \end{bmatrix} \right\|. \quad (5)$$

That is, the matrices W and D minimize the reconstruction error $$\left\| A - [W, D] \begin{bmatrix} S \\ -1 \end{bmatrix} \right\|$$

subject to the constraint that all entries in W and D must be non-negative. Equation (5) is a nonlimiting example of a non-negatively constrained least squares problem.

The second step of the algorithm is to estimate S, holding W and D fixed. More specifically, the new matrix S solves the optimization problem $$S = \mathrm{argmin}_{\{\tilde{S}: \tilde{s}_{i,j} \geq 0\}} \| A - [W\tilde{S} - D] \|. \quad (6)$$

That is, the matrix S minimizes the reconstruction error $\|A-[WS-D]\|$ subject to the constraint that all entries in S must be non-negative. Equation (6) is an instance of a non-negatively constrained least squares problem.

The third step of the algorithm is to smooth the images E and H in the rows of S. Every pixel value is replaced by a weighted average of nearby pixel values. The weights are given by a Gaussian kernel $$\frac{1}{\sqrt{2\pi\sigma^2}} e^{-\frac{d^2}{2\sigma^2}}, \quad (7)$$

where d is the distance to the current pixel. The value of the parameter σ decreases at each iteration. This step of the algorithm is designed to regularize the convergence of the algorithm, thus reducing the risk of converging into local minima due to noise.

The matrix S is initialized as follows, $$S = \begin{bmatrix} E \\ H \end{bmatrix} = \begin{bmatrix} (2R' + B')/3 \\ R' - G' \end{bmatrix}. \quad (8)$$

and then the unmixing steps described above are repeated, until convergence. The initialization is approximate and should be determined based on a given application. It approximates the pseudoinverse inverse of the mixing matrix for a set of stromal and epithelial tissue images. This initialization needs to be tested for different instruments, since each instrument has a different illumination spectra.

The H and E components are estimated within the S matrix by solving the minimization problem formulated in equations (5 and 6). The residual channels are estimated by subtracting the reconstructed channels from the observed channels, $$\begin{bmatrix} R'_{res} \\ G'_{res} \\ B'_{res} \end{bmatrix} = \begin{bmatrix} R' \\ G' \\ B' \end{bmatrix} - \begin{bmatrix} \hat{R}' \\ \hat{G}' \\ \hat{B}' \end{bmatrix}, \quad (9)$$

where the reconstructed channels are determined by, $$\begin{bmatrix} \hat{R}' \\ \hat{G}' \\ \hat{B}' \end{bmatrix} = \tilde{W}\tilde{S} - \tilde{D}. \quad (10)$$

Before reconstructing the images, the staining proportions of Hematoxylin and Eosin (H&E) channels are digitally adjusted in this step. The channels may be adjusted using various steps including, but not limited to, gamma correction, contrast adjustment, brightness adjustment and histogram equalization. In this example, gamma correction is used as follows, $$\begin{bmatrix} R'_{adj} \\ G'_{adj} \\ B'_{adj} \end{bmatrix} = \begin{bmatrix} w_{11} & w_{12} \\ w_{21} & w_{22} \\ w_{31} & w_{32} \end{bmatrix} \begin{bmatrix} E^{\gamma e} \\ H^{\gamma h} \end{bmatrix} - \begin{bmatrix} d'_R \\ d'_G \\ d'_B \end{bmatrix} \quad (11)$$

The residual channels are next added to the adjusted channels and subtracted from the absorption free intensity observations. All the NMF and contrast adjustment formulations are in the absorption domain, where the final subtraction represents the image in the original brightfield transmission domain.

$$\begin{bmatrix} R_{adj} \\ G_{adj} \\ B_{adj} \end{bmatrix} = \begin{bmatrix} M_R \\ M_G \\ M_B \end{bmatrix} - \left( \begin{bmatrix} R'_{adj} \\ G'_{adj} \\ B'_{adj} \end{bmatrix} + \begin{bmatrix} R'_{res} \\ G'_{res} \\ B'_{res} \end{bmatrix} \right), \quad (12)$$

These steps of the methods were applied to various H & E stained tissue images.

The first example of the application of the method was conducted on a prostate carcinoma tissue sample shown in series (a)-(g) in FIG. 3. Image series (a)-(g), shown in each of FIGS. 3 through 8, correspond to the (a) original image, (b) reconstructed image, (c) estimated eosin, (d) estimated hematoxylin, (e) red channel, (f) green channel, and (g) blue channel. The example image shown in FIG. 3 has three glandular structures in it and there are necrotic cells in the glands. There are also some elongated fiber blasts in the stromal region.

The second example, shown in series (a)-(g) in FIG. 4, was conducted on a benign cervix tissue sample. The top part of the image shows red blood cells (RBC). Below these red blood cells is the basal layer and below the basal layer is the epithelial cell layer. The estimated eosin image captures the red blood cells whereas the estimated hematoxylin image captures the epithelial cells and the basal layer. Although NMF is quite successful, the RBCs turn out to be close to the connected tissue in the reconstructed image. The RBCs comprise hemoglobin that causes them to appear redder than the stromal region and this information cannot be entirely preserved using NMF because it first reduces the dimension and then reconstructs it.

FIG. 5 depicts a colon polyp tissue sample, shown in series (a)-(g), showing high-grade dysplasia. This image shows a glandular structure where the basal cells are the border of the gland, as well as the cytoplasm and the nuclei in the adjacent regions. When the eosin and hematoxylin are estimated, these two regions are disjointed in the resulting base images.

As in the case of the example shown in FIG. 6, the image of colon polyp tissue sample shows RBCs on the left. A basal line is also apparent in this tissue image. In the decomposed images, the eosin channel successfully captures the RBCs and hematoxylin channel captures the epithelial cells. Even after the digital staining brown pigments are still visible in the reconstructed image. This is a significant feature of the methods because it enables brown pigments to be more visible in the reconstructed image than they were in the original image. By using the digital stainer of the invention, it is possible to change the eosin and hematoxylin ratios while preserving colored structures that are not fully represented with H and E components.

The digital stainer is not limited to use on clear or otherwise perfect images. As shown in a series of image in FIG. 7, the tissue has a fold on the left hand side. The folded regions in the original image are pinker than the rest of the tissue and therefore it would be desirable, for certain applications, to decrease the eosin for this image. The estimated eosin and the hematoxylin are given in series (c) and (d), respectively. Note the little holes in the eosin channel and how these match to the nuclei at the hematoxylin channel. The red, green, blue channels shown in series (e)-(g), are not nearly as effective for capturing the eosin channel shown in series (c).

FIG. 8 shows an example image in which the folded tissue is too dark. Here the nuclei are almost black and the center of the tissue is hard to investigate. Series 10, (a)-(g) show how an image, even like this, can be improved using digital stainer of the invention.

FIGS. 9 through 14 show the example tissue images of FIGS. 3-8, respectively, in which the following nine non-limiting variations are used:

If $\gamma_e=1$ and $\gamma_h=1$ The adjusted R, G, B components are the same as the original image.

If $\gamma_e<1$ and $\gamma_h=1$ Eosin contrast is increased.

If $\gamma_e=1$ and $\gamma_h<1$ Hematoxylin contrast is increased.

If $\gamma_e<1$ and $\gamma_h<1$ Both Eosin and Hematoxylin contrasts are increased.

If $\gamma_e>1$ and $\gamma_h=1$ Eosin contrast is decreased.

If $\gamma_e=1$ and $\gamma_h>1$ Hematoxylin contrast is decreased.

If $\gamma_e>1$ and $\gamma_h>1$ Both Eosin and Hematoxylin contrasts are decreased.

If $\gamma_e<1$ and $\gamma_h>1$ Eosin contrast is increased and the Hematoxylin contrast is decreased.

If $\gamma_e>1$ and $\gamma_h<1$ Eosin contrast is decreased and the Hematoxylin contrast is increased.

NMF may not be appropriate for all applications. For example, the base image recovery depends in part on permutations and scaling ambiguity. More specifically, one cannot be sure about the order of the output base images without additional analysis. For example, the first image to which a method might be applied may correspond to eosin or hematoxylin while the second image may correspond to one or more other stains. Additional ambiguity may be introduced because each of these images can be multiplied by a scalar and the corresponding coefficients in the matrix can be divided by the same scalar without changing the reconstructed image. These ambiguities are thus corrected in the context of the H&E images. So, for example, the eosin channel generally carries information primarily relating to the red channel. The variance in the first column of the mixing matrix is greater than the variance in the second column. When this is not the case, the eosin and hematoxylin images may be interchanged. For the scaling ambiguity, one method may comprise scaling each column so that the maximum in that column is set to 1. The NMF decomposition solves a least-square approximation and there the resulting images are only approximations. From the estimated eosin and hematoxylin channels, an approximation off the original image is constructed. This reconstructed image is also a multichannel image. For each of the channels, the residual images, defined as the subtraction of the approximated channel from the corresponding original channel, are calculated. These residual images may comprise negative and positive values. The residual images will be used in the reconstruction, which is generally the last step.

Each or some of the base images are adjusted by gamma correction. Each base image is divided to the maximum value in that image to scale the values between 0 and 1 where the gamma function is defined. A gamma value of 1 does not change the base image whereas, a gamma value less than 1 will brighten the image and a gamma value greater than 1 will darken the image. In the case of H&E, there are 3×3 cases where gamma can have values greater than 1, less than 1 or equal to 1 for eosin or hematoxylin. Each of these examples is illustrated without loss of generality. The adjusted images are merged and the residual images are added to finalize the digital staining of the original images.

The automated system 10 (FIG. 15), for carrying out the methods generally comprises: a storage device 12 for at least temporarily storing one or more images, wherein the images comprise a plurality of channels; and a processor 14. The system may further comprise an imaging microscope, such as a bright field microscope, with a digital imaging component; and/or a digital display device. Processor 14 may be configured with a variety of available functionalities suitable for research and clinical applications and uses.

The storage device may comprise, but is not necessarily limited to, any suitable hard drive memory associated with the processor such as the ROM (read only memory), RAM (random access memory) or DRAM (dynamic random access memory) of a CPU (central processing unit), or any suitable disk drive memory device such as a DVD or CD, or a zip drive or memory card. The storage device may be remotely located from the processor or the means for displaying the images, and yet still be accessed through any suitable connection device or communications network including but not limited to local area networks, cable networks, satellite networks, and the Internet, regardless whether hard wired or wireless. The processor or CPU may comprise a microprocessor, microcontroller and a digital signal processor (DSP).

The storage device 12 and processor 14 may be incorporated as components of an analytical device such as an automated low-, medium- or high-throughput system that multiplexes and images in one system and still further analyzes the images. One of more of these steps may be configured into one system or embodied in one or more stand-alone systems. System 10 may further comprise a display device 16 for displaying one or more of the original or enhanced images; an interactive viewer 18; a virtual microscope 20; and/or a transmitter 22 for transmitting one or more of the images or any related data or analytical information over a communications network 24 to one or more remote locations 26.

Display device 16 may comprise any suitable device capable of displaying a digital image such as, but not limited to, devices that incorporate an LCD or CRT. The transmitter 22 may comprise any suitable means for transmitting digital information over a communications network including but not limited to hardwired or wireless digital communications systems. The system may further comprise an automated device 28 for applying one or more of the stains and a digital imaging device 30 such as, but not limited to, an imaging microscope comprising an excitation source 32 and capable of capturing digital images of the material. Such imaging devices are preferably capable of auto focusing and then maintaining and tracking the focus feature as needed throughout processing.

These multi-channel methods are not limited to multiplexing or to pathology. Any dye, marker or probe that enables some informative aspect or feature of a biological sample to be visualized so that it can be digitally imaged and processed would be suitable for these methods. Suitable stains and markers include, but are not necessarily limited to, cytological or morphological stains, immunological stains such as immunohisto- and immunocyto-chemistry stains, cytogenetical stains, in situ hybridization stains, cytochemical stains, DNA and chromosome markers, and substrate binding assay stains. Other medical and bioscience applications can benefit from the extended multi-channels. These multi-channel methods provide a flexible framework in which markers can be imaged sequentially without being limited to optical, chemical, and biological interactions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for digitally enhancing an initial image of a material to which a plurality of stains were previously applied, comprising the steps of:
   unmixing the initial image into a plurality of individual reconstructed images, wherein the initial image corresponds to an image data set generated from an imaging device, and wherein each individual image corresponds to one of the stains;
   estimating a residual image corresponding to a difference between the initial image and the unmixed reconstructed images;
   adjusting one or more components of the individual reconstructed images, wherein the adjusting is based on a characteristic of the stain;
   mixing the adjusted components; and
   adding the residual image to the mixed adjusted components to generate an enhanced image.

2. The method of claim 1, further comprising the step of, estimating one or more mixing coefficients for the stains prior to adjusting one or more components of the individual images; and mixing the adjusted components using the estimated mixing coefficients.

3. The method of claim 1, wherein the image is of a material to which hemotoxylin and eosin stains were applied and wherein at least two of the unmixed individual images correspond to hemotoxylin and eosin.

4. The method of claim 1, wherein the material of the image comprises a biological tissue sample.

5. The method of claim 4, wherein the biological tissue comprises one or more abnormal cells.

6. The method of claim 1, wherein the image of material comprises a color image, and wherein the step of adjusting comprises increasing or decreasing a saturation or contrast level of an intensity in the image.

7. The system of claim 1, wherein the imaging device is a brightfield microscope.

8. A system for digitally enhancing an initial image of a material to which a plurality of stains were previously applied, comprising:
   a memory component for at least temporarily storing the image of the material;
   a processor that unmixes the initial image into a plurality of individual reconstructed images, wherein the initial image corresponds to an image data set generated by an imaging device, and wherein each individual image corresponds to one of the stains; estimates a residual image corresponding to a difference between the initial image and the reconstructed images; adjusts one or more components of the individual images wherein the adjusting is based on a characteristic of the stain; mixes the adjusted components using estimated mixing coefficients; and adds the residual image to the mixed adjusted components to generate an enhanced image; and
   a display device for displaying the enhanced image.

9. The system of claim 8, wherein the imaging device is a brightfield microscope.

10. The system of claim 8, further comprising an automated subsystem for applying the plurality of stains to the material.

11. The system of claim 10, wherein the material is a biological tissue sample.

* * * * *